United States Patent
Leonard

(10) Patent No.: US 7,886,698 B2
(45) Date of Patent: Feb. 15, 2011

(54) ANIMAL CALMING DEVICE AND METHODS THEREOF

(76) Inventor: Tina Leonard, 152 Parkside La., Cedar Run, NJ (US) 08092

( * ) Notice: Subject to any disclaimer, the term of this patent is extended or adjusted under 35 U.S.C. 154(b) by 337 days.

(21) Appl. No.: 12/212,410

(22) Filed: Sep. 17, 2008

(65) Prior Publication Data

US 2010/0064979 A1  Mar. 18, 2010

(51) Int. Cl.
 A01K 29/00 (2006.01)
(52) U.S. Cl. .................. 119/601; 119/652; 119/174
(58) Field of Classification Search .......... 119/601, 119/174, 712, 621, 652, 663, 664
See application file for complete search history.

(56) References Cited

U.S. PATENT DOCUMENTS

| | | | | |
|---|---|---|---|---|
| 2,693,610 A | * | 11/1954 | Hensley, Jr. ............ | 15/104.002 |
| 2,708,761 A | * | 5/1955 | Bergquist ............... | 15/104.002 |
| 3,373,457 A | * | 3/1968 | Rouch, Jr. ............... | 15/104.002 |
| 3,686,025 A | | 8/1972 | Morton | |
| 3,892,247 A | | 7/1975 | Andersen | |
| 3,944,694 A | * | 3/1976 | McQueary ............... | 428/131 |
| 4,676,915 A | * | 6/1987 | Steltenkamp et al. ....... | 510/330 |
| 4,907,825 A | * | 3/1990 | Miles et al. .............. | 281/51 |
| 5,027,465 A | * | 7/1991 | McKay .................. | 15/104.002 |
| D320,680 S | * | 10/1991 | Stetson et al. ............ | D30/158 |
| 5,085,892 A | * | 2/1992 | Corona et al. ............ | 427/365 |
| 5,228,632 A | * | 7/1993 | Addison et al. .......... | 242/588.2 |
| D342,610 S | * | 12/1993 | Stetson et al. ........... | D4/122 |
| 5,297,512 A | | 3/1994 | Sharp | |
| 5,310,057 A | * | 5/1994 | Caldwell et al. .......... | 206/494 |
| 5,353,817 A | | 10/1994 | Kantor et al. | |
| 5,495,633 A | * | 3/1996 | Speer ................... | 15/104.94 |
| 5,545,342 A | * | 8/1996 | Beagle et al. ............ | 510/299 |
| 5,632,289 A | | 5/1997 | Sharp | |
| 5,685,257 A | * | 11/1997 | Feibus .................. | 119/28.5 |
| 5,957,090 A | | 9/1999 | Larson | |
| 6,364,156 B1 | * | 4/2002 | Smith et al. ............. | 221/46 |
| 6,449,794 B1 | * | 9/2002 | Jaffri .................... | 15/104.002 |
| 6,575,173 B2 | | 6/2003 | Quan et al. | |
| 6,694,925 B2 | * | 2/2004 | Critzer ................. | 119/850 |
| 6,777,064 B1 | * | 8/2004 | Brown et al. ............ | 428/171 |
| 7,100,537 B1 | | 9/2006 | Suen | |
| 7,107,643 B1 | * | 9/2006 | McKay ................ | 15/104.002 |
| 7,655,609 B2 | * | 2/2010 | Torres et al. ............. | 510/299 |
| 7,694,848 B2 | * | 4/2010 | Petry ................... | 221/283 |
| D622,989 S | * | 9/2010 | Lagler et al. ............ | D6/515 |

(Continued)

*Primary Examiner*—Yvonne R. Abbott
(74) *Attorney, Agent, or Firm*—Fallon & Fallon LLC; Jon Fallon, Esq.

(57) ABSTRACT

Embodiments of the present invention relate to a non-powered calming device for use on an animal's fur, and a method of using the same. In accordance with one embodiment of the present invention, a non-powered animal calming device comprises an anti-static material disposed on a sheet, held on a dispensing structure, wherein the anti-static material is suitable to neutralize a sustained separation of positive and negative charges in the animal's fur without the use of a power source. In yet another embodiment of the present invention, a method of calming an animal comprises providing a non-powered animal calming device comprising an anti-static material disposed on a sheet, held in connection with a dispensing structure, contacting the animal's fur with the animal calming device, and neutralizing a sustained separation of positive and negative charges in the animal's fur without the use of a power source.

7 Claims, 5 Drawing Sheets

U.S. PATENT DOCUMENTS

| | | |
|---|---|---|
| 2002/0096125 A1 | 7/2002 | Fong |
| 2002/0124335 A1* | 9/2002 | Franko, Sr. ............ 15/104.002 |
| 2003/0096074 A1* | 5/2003 | Kim ........................ 428/40.1 |
| 2003/0224962 A1* | 12/2003 | Fryc ......................... 510/438 |
| 2004/0194240 A1* | 10/2004 | McKay, Jr. ............ 15/104.002 |
| 2005/0229349 A1* | 10/2005 | Foser ......................... 15/227 |
| 2006/0037555 A1* | 2/2006 | Jackson .................... 119/601 |
| 2006/0071119 A1* | 4/2006 | Zeitlin ..................... 242/598.3 |
| 2006/0270677 A1 | 11/2006 | Enos et al. |
| 2006/0272594 A1 | 12/2006 | Cox et al. |
| 2008/0099595 A1* | 5/2008 | Lewis et al. ................. 242/560 |
| 2008/0100982 A1* | 5/2008 | Lewis et al. ................. 361/220 |
| 2008/0196186 A1* | 8/2008 | Vidmar et al. ......... 15/104.002 |
| 2009/0178625 A1* | 7/2009 | Watson et al. ............... 119/601 |
| 2009/0302048 A1* | 12/2009 | Nobilet et al. ................. 221/1 |

* cited by examiner

400

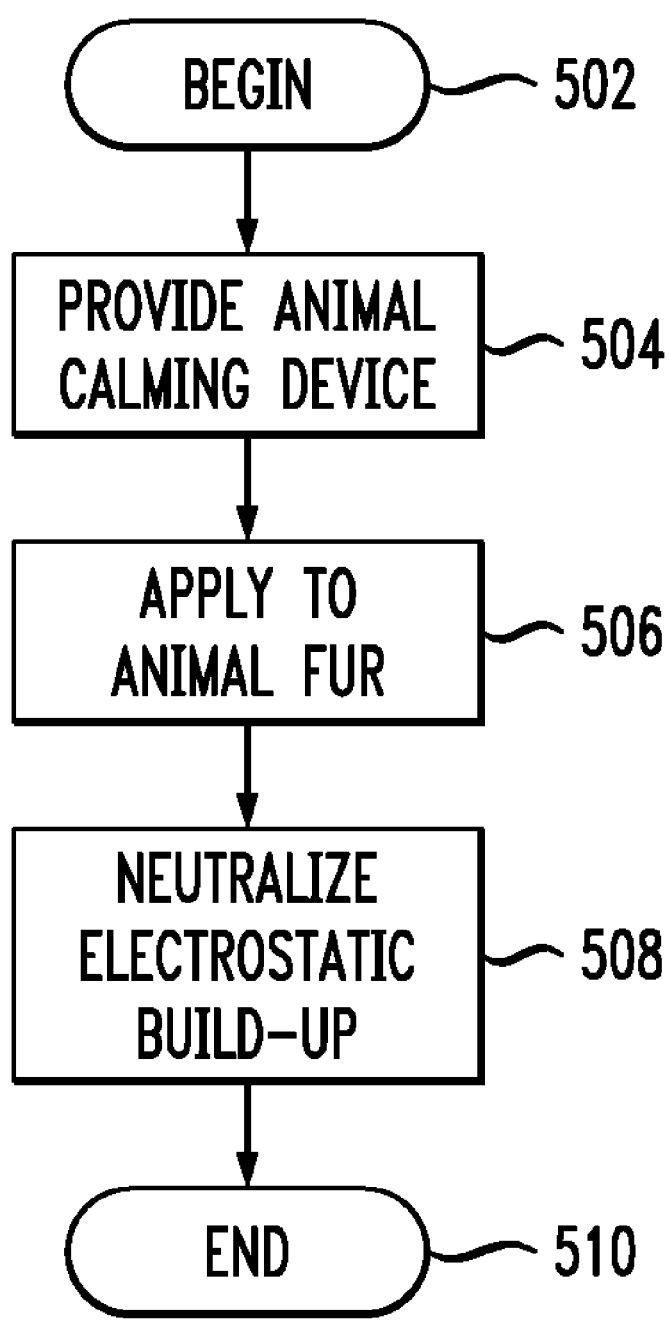

ANIMAL CALMING DEVICE AND METHODS THEREOF

BACKGROUND

1. Field of the Invention

Embodiments of the present invention generally relate to an animal calming device and methods thereof. More specifically, embodiments of the present invention relate to a calming device for use on an animal's fur, and a method of using the same.

2. Description of the Related Art

It is well-known that many commonly domesticated animals, such as cats and dogs, can become extremely tense and nervous in a variety of situations, especially during thunderstorms, and other naturally-occurring meteorological events. During such events, there is a significant change in atmospheric properties (e.g., pressure, temperature, humidity, etc.) caused by a number of phenomena. However, most of these changes are largely undetectable by human senses alone.

Animals, on the other hand, are quite capable on sensing even the slightest change in environmental properties. Animals having fur can often sense an oncoming thunderstorm, or other meteorological event, and may begin to act erratic, excited, scared, or phobic and may begin to pant and/or shake. The ability to sense the oncoming storm can largely be attributed to the change in the natural electrical charge built-up in the animal's fur (i.e., static electricity), often causing a tingling or painful feeling for the animal.

To reduce the level of static charge in the fur, it may be advantageous and effective to utilize an anti-static device. Some previous attempts at such devices for animals have included physical restraining devices (e.g., muzzles and capes/towels), which require the animal to sit still or be held still long enough for the apparatus to be placed on the animal, after which the animal must wear or be contained within the apparatus until environmental conditions return to status quo. Also, electrically-powered grooming devices (e.g., ionic brushes, combs, and the like) have been used, but require a AC/DC power source, and vibrate and/or emit a noise, both of which may be additionally stressful for the animal. Furthermore, powered-devices require a constant power source, which may not always be available (e.g., batteries run out, power outage, etc.) during or just before a thunderstorm.

Thus, there is a need for an improved non-powered animal calming device, and a method of using the same.

SUMMARY OF THE INVENTION

Embodiments of the present invention relate to a non-powered calming device for use on an animal's fur, and a method of using the same. In accordance with one embodiment of the present invention, a non-powered animal calming device comprises an anti-static material disposed on a sheet, held with a dispensing structure, wherein the anti-static material is suitable to neutralize a sustained separation of positive and negative charges in the animal's fur without the use of a power source.

In another embodiment of the present invention, a non-powered animal calming device comprises a dispensing structure, defining an accessible interior volume, and an anti-static material, disposed on a plurality of separable sheets, contained within the interior volume of the dispensing structure, wherein the anti-static material is suitable to neutralize a sustained separation of positive and negative charges in the animal's fur without the use of a power source.

In yet another embodiment of the present invention, a method of calming an animal, the method comprises providing a non-powered animal calming device comprising an anti-static material disposed on a sheet, held in connection with a dispensing structure, contacting the animal's fur with the animal calming device, and neutralizing a sustained separation of positive and negative charges in the animal's fur without the use of a power source.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein:

FIG. 5 depicts a flow chart of a method in accordance with one embodiment of the present invention.

Figure 1:
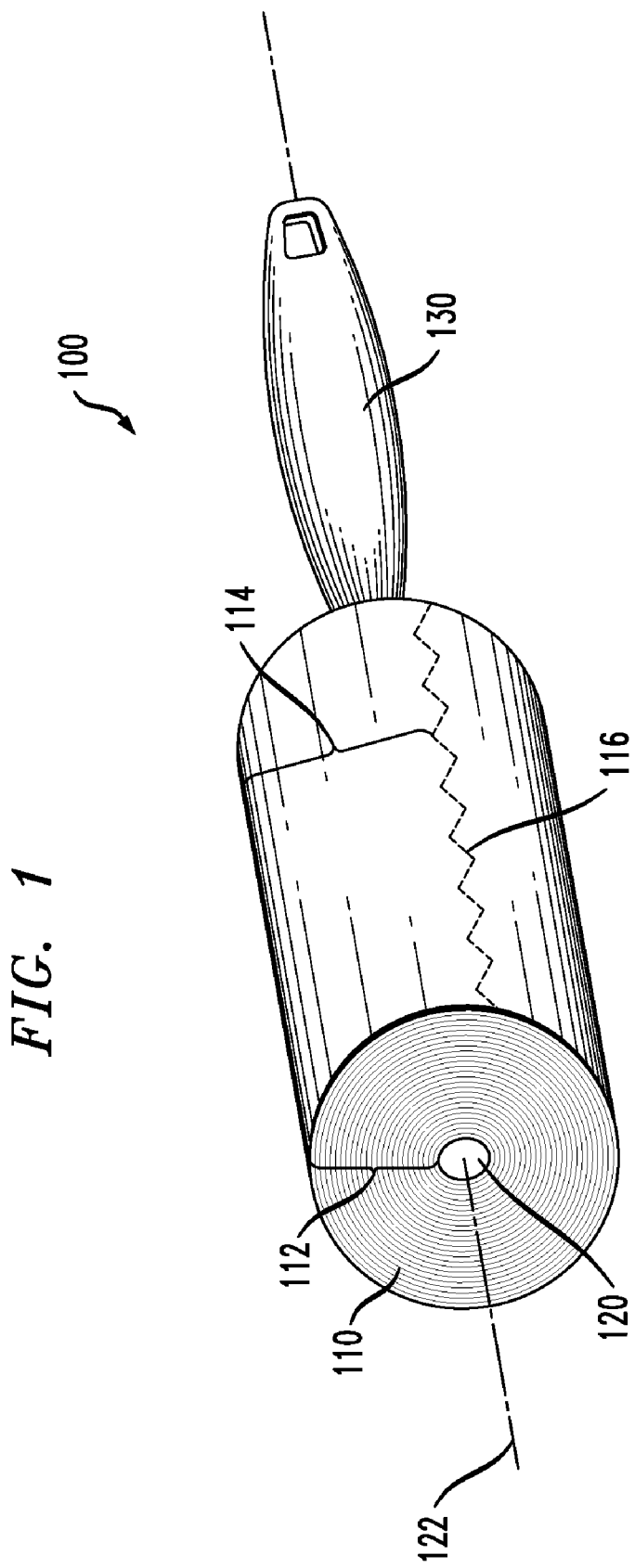
FIG. 1 depicts an animal calming device in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to an animal calming device and methods thereof. More specifically, embodiments of the present invention relate to a non-powered calming device for use on an animal's fur, and a method of using the same.

FIG. 1 depicts an animal calming device 100 in accordance with one embodiment of the present invention. The animal calming device 100 generally includes an anti-static material 110, disposed in, on or with a dispensing structure 120, and optionally having a handle 130. Often, the anti-static material 110 may be dispensed in the form of a sheet 114. Each sheet 114 may have perforations 116 and may be connected to an adjacent sheet along the perforation 116 to create a plurality of sheets 112. In many embodiments, the plurality of sheets 112 may be rotatable about the dispensing structure 120 along an axis 122. In some embodiments the sheets 112 may be provided with an aesthetic print design, for example, a pattern, a trademark, a logo, and the like. Optionally, the aesthetic print design may also include paw prints, animal silhouettes, various colors, or the like.

The anti-static material 110 may comprise any material capable of neutralizing an electrostatic charge suitable for embodiments of the present invention. For example, the anti-static material 110 may comprise long-chain aliphatic amines (optionally ethoxylated) and amides, quaternary ammonium salts (e.g., behentrimonium chloride or cocamidopropyl betaine), esters of phosphoric acid, polyethylene glycol esters, or polyols. Additional examples of such an anti-static material 110 may be found in ordinary dryer sheets used in connection with a laundering process for garments and clothes. In one of many alternative embodiments, the anti-static material 110 may comprise a non-toxic chemical dispersed within a composition of woven fabric. In yet another embodiment, the anti-static material 110 may comprise a chemical-free woven fabric composition capable conducting an electrical charge away from the animal's fur.

Optionally, the anti-static material 110 may also be blended with a material for collecting shed fur or hair. For example, in one embodiment, the anti-static material 110 may be blended with a toxic-free adhesive having a low cohesion value, for adhering to shed fur or hair as the anti-static material 110 is passed over the animal's coat in accordance with embodiments set forth herein. In another embodiment, the anti-static material 110 may also be provided with an insect repellant or non-toxic chemical for warding off fleas and ticks. As contemplated by embodiments of the present invention, the anti-static material 110 and/or sheet 114 may comprise many additional components with varying designs, as commonly available in the fields of animal husbandry and/or electrostatic material design.

The dispensing structure 120 may include any design capable of supporting and dispensing anti-static material 110 from the animal calming device 100, in accordance with embodiments of the present invention. As shown in FIG. 1, the dispensing structure 120 may comprise a center-axle for plurality of sheets 112. Optionally, the dispensing structure 120 may be integrally formed with a handle 130, for ease of use. In such an embodiment, the animal calming device may be operated much like an ordinary household lint brush, whereby a user may hold the handle 130 as the anti-static material 110, dispersed in a plurality of interconnected perforated sheets 112, is applied to a surface (i.e., an animal's fur) (not shown) as the sheets 112 rotate about the dispensing structure 120. When finished, a used sheet 114 may be removed along its perforation 116 and discarded.

Figure 2:
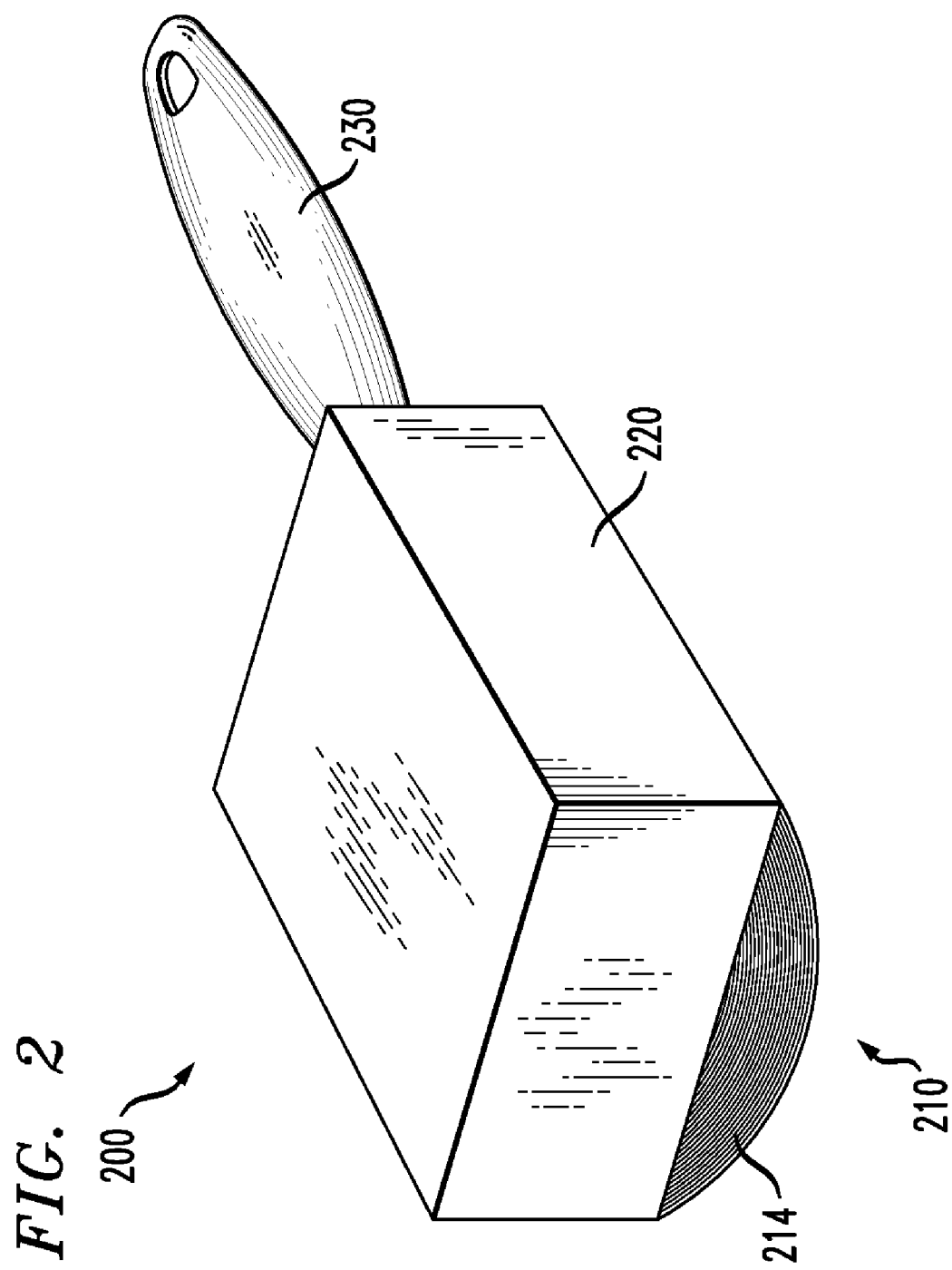
FIG. 2 depicts an animal calming device in accordance with one embodiment of the present invention.

FIG. 2 depicts an animal calming device 200 in accordance with one embodiment of the present invention. Similar to the embodiment shown in FIG. 1, the animal calming device 200 generally includes an anti-static material 210, disposed in a dispensing structure 220, and optionally having a handle 230. The anti-static material 210 may be dispensed in the form of a sheet 214, structurally disposed inside the dispensing structure 220.

Figure 3:
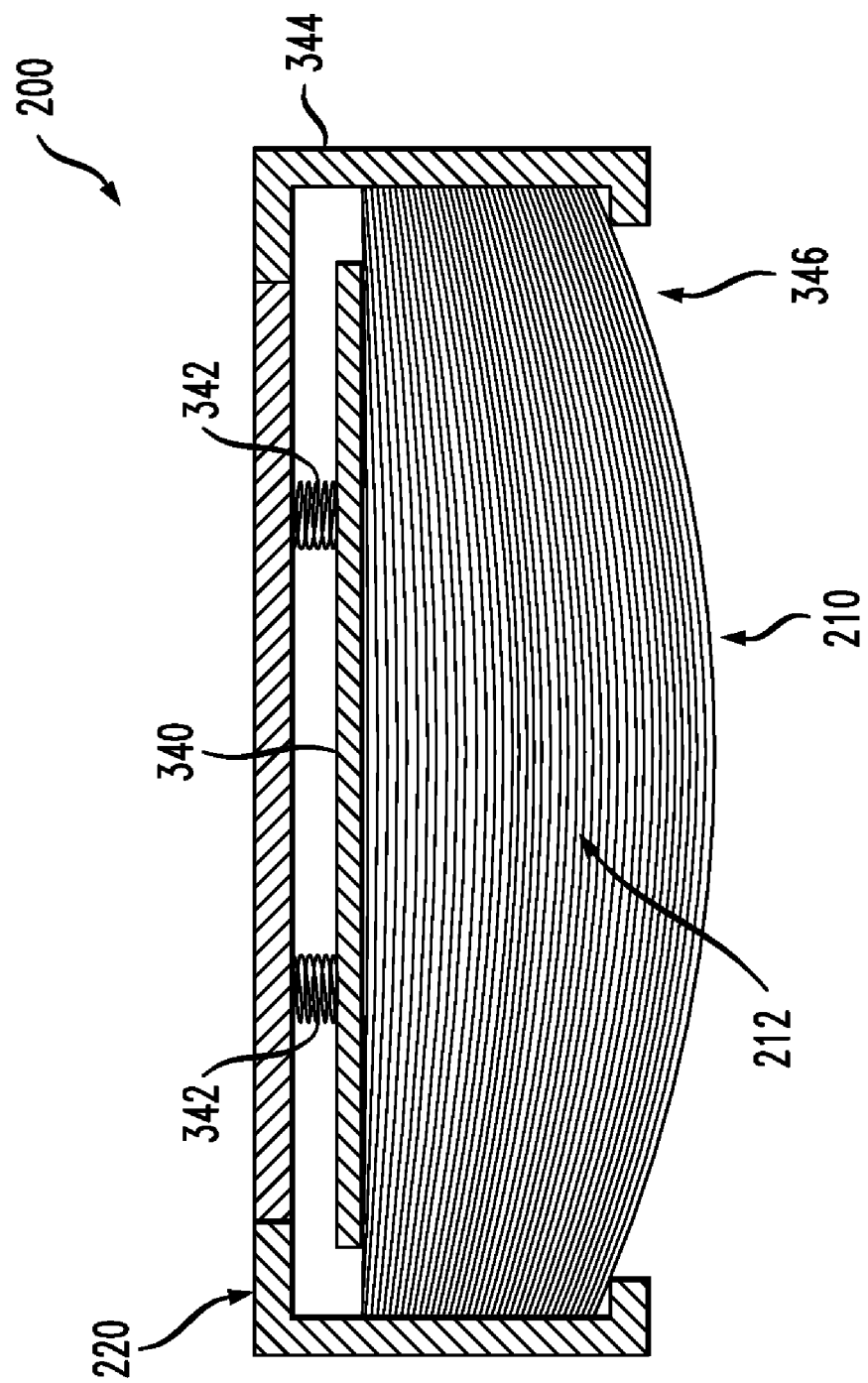
FIG. 3 depicts a cross-sectional view of the animal calming device of FIG. 2.

The dispensing structure 220 may comprise any containment apparatus suitable for embodiments of the present invention. In many embodiments, the dispensing structure 220 comprises a rigid body having an interior volume for supporting a sheet 214 or a plurality of sheets. FIG. 3 depicts a cross-sectional view of the animal calming device of FIG. 2.

As shown in FIG. 3, in one exemplary embodiment of the present invention, a dispensing structure 220 may comprise a substantially rectangular cross-section having three rigid walls 344 and one open wall 346, for allowing access to the plurality of sheets 212. The dispensing structure 320 may include an optional retainer mechanism 340 having biasing devices 342 to retain the sheets 314 stationary within the dispensing structure 320. The biasing device 342 may include the use of a coil spring, a tension spring, compression spring, biasing structure, elastic material, any other device suitable for embodiments of the present invention. Many further embodiments and designs of a retaining mechanism 340 are known by those of ordinary skill in the art, and therefore, no further explanation is needed.

In accordance with one embodiment of the present invention, the animal calming device 200 may comprise a refillable cartridge conformed to fit within the interior volume of the dispensing structure 220. In such an embodiment, a sheet 214 dispersed with anti-static material 210 may be loaded into the refillable cartridge. Alternatively, an interlocking stack of sheets, each having anti-static material therein, would be provided in the refillable cartridge. The operation of such a refillable cartridge would be similar to known examples of sheet materials having an interlocking design, such as: facial tissues, dryer sheets, deli parchment, and the like.

Figure 4:
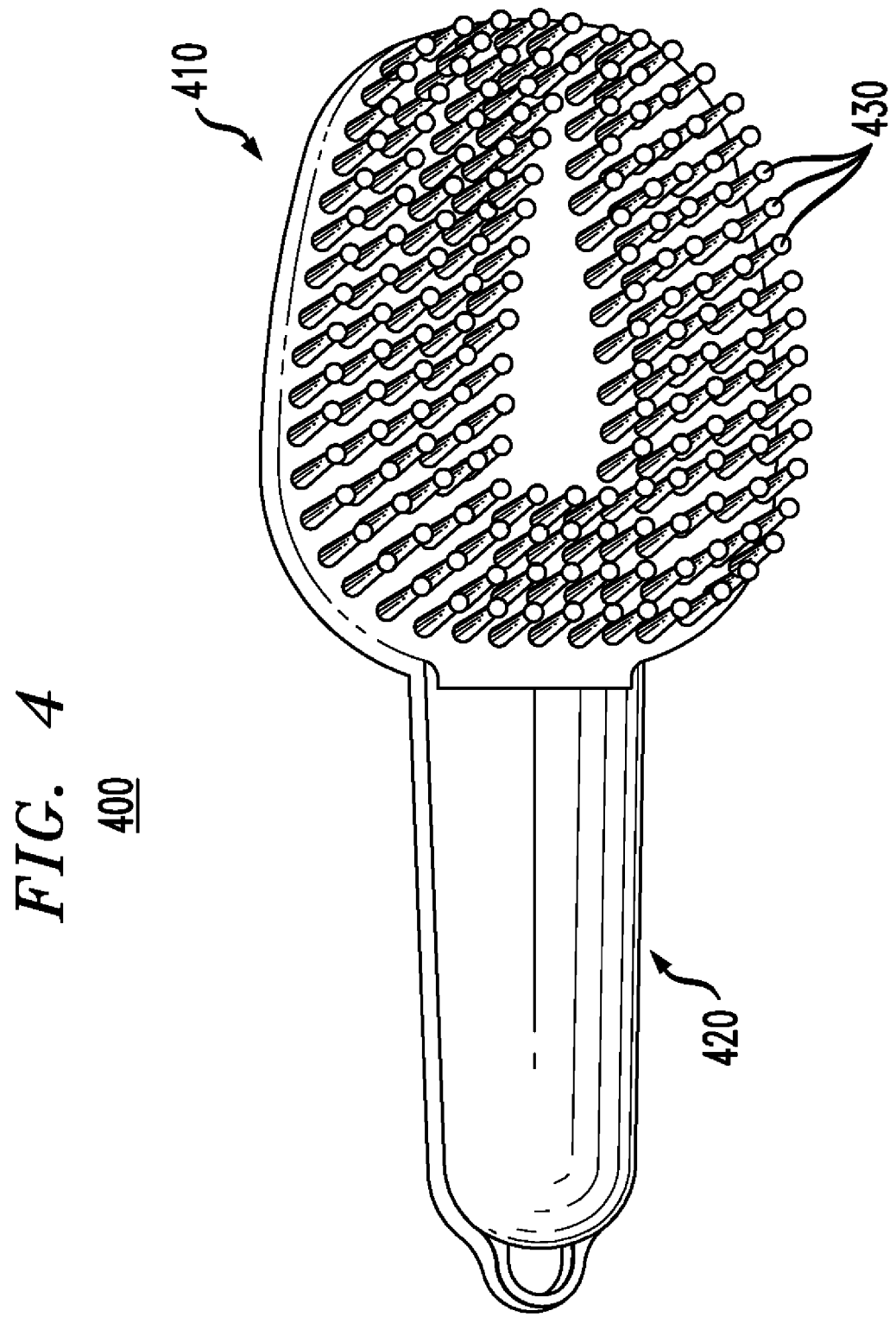
FIG. 4 depicts an animal calming device in accordance with one embodiment of the present invention.

FIG. 4 depicts an animal calming device 400 in accordance with one embodiment of the present invention. In the embodiment depicted in the Figure, the animal calming device 400 comprises a body 410, an optional handle 420, and a surface feature 430, or plurality of surface features, for providing massaging stimulation to an animal or for grooming the animal (e.g., removing excess or shed hair). The surface feature 430 may comprise a tine, bump, ridge, or any other textured surface suitable for embodiments of the present invention.

In accordance with embodiments of the present invention, anti-static material may be provided within the animal calming device 400, in either of the body 410 or surface feature 430. For example, in one embodiment, the surface feature 430 comprises a plurality of tines or protrusions comprising an anti-static material therein (i.e., the material composition of the tines includes the anti-static material). In another exemplary embodiment, the body 410 of the animal calming device 400 comprises an anti-static material. In yet another embodiment, an anti-static material may be additionally provided (e.g., sprayed, coated, and the like) on the surface of either the body 410 or surface feature 430 before utilizing on an animal.

In alternative embodiments of the present invention, the animal calming device may be included within the structure of another article. Generally, the article may be of animal husbandry nature, such as an animal bed, a transporting cage, an animal doorway, an animal toy, an animal collar, or the like. However, the article may also include devices not within the field of animal husbandry, such as a floor or wall of a room. In accordance with other embodiments of the present invention, the animal calming device may be affixed, removably attached, integrated, or the like, with such other article.

FIG. 5 depicts a flow chart of a method 500 in accordance with one embodiment of the present invention. The method 500 begins at step 502. At step 504, an animal calming device is provided. In accordance with embodiments of the present invention, an animal calming device comprises a non-powered device having anti-static material disposed on a dispensing structure. Optionally, the animal calming device further comprises a handle or other handling means to enable human operation.

At step 506, the animal calming device is applied to an animal's fur. In one embodiment, the animal calming device is utilized similar to a brush or comb for animal grooming. As such, the anti-static material, whether embodied in a sheet, a protrusion, a non-toxic chemical, etc., is applied directly to the fur coat of the animal.

At step 508, the electrostatic build-up in the animal's fur in substantially neutralized by the anti-static material. As understood by those of ordinary skill in the art, the interaction of the anti-static material with the animal's fur causes the neutralization of the sustained separation of positive and negative charges in the fur. At step 510, the method 500 ends.

While the foregoing is directed to embodiments of the present invention, other and further embodiments of the invention may be devised without departing from the basic scope thereof. Alternative embodiments of the present invention generally incorporate the structures and methods described in the embodiments above, with minor additions and/or modifications. The previous embodiments may be considered independently or in combination with any other embodiment contained herein.

What is claimed is:

1. A method of calming an animal comprising:
providing a non-powered animal calming device comprising an anti-static material disposed on a sheet, held in connection with a dispensing structure;
contacting the animal's fur with the animal calming device; and
neutralizing a sustained separation of positive and negative charges in the animal's fur without the use of a power source.

2. The method of claim 1, further comprising the step of grooming or massaging the animal using the non-powered animal calming device.

3. The method of claim 1, wherein the animal calming device further comprises a handle affixed to the dispensing structure.

4. The method of claim 1, wherein the anti-static material comprises at least one of a long-chain aliphatic amine or amide, a quaternary ammonium salt, an ester of phosphoric acid, a polyethylene glycol ester, or a polyol.

5. The method of claim 1, wherein the anti-static material comprises a woven composition of the sheet.

6. The method of claim 1, wherein the anti-static material is disposed on a plurality of separable sheets.

7. The method of claim 6, wherein each of the plurality of separable sheets is removable and disposable.

* * * * *